Feb. 27, 1940.   J. J. HENNESSY   2,191,468
JOURNAL LUBRICATOR DEVICE
Filed July 16, 1937   2 Sheets-Sheet 1

Inventor
James J. Hennessy
By Rodney Bedell
Attorney

Feb. 27, 1940.   J. J. HENNESSY   2,191,468
JOURNAL LUBRICATOR DEVICE
Filed July 16, 1937   2 Sheets-Sheet 2

Inventor
James J. Hennessy
By Rodney Bedell
Attorney

Patented Feb. 27, 1940

2,191,468

UNITED STATES PATENT OFFICE 2,191,468

JOURNAL LUBRICATOR DEVICE

James J. Hennessy, Montclair, N. J.

Application July 16, 1937, Serial No. 153,925

12 Claims. (Cl. 308—80)

The invention relates to railway rolling stock journal or axle boxes and particularly to such structures which have associated therewith a mechanical lubricator or other device for feeding lubricant to the bearing, such for example as are shown in my copending applications Serial No. 711,933, filed February 19, 1934, and Serial No. 756,796, filed December 10, 1934, (now Patent No. 2,123,946 issued July 19, 1938).

Boxes and lubricators of this type must operate under varying conditions, some of which are highly favorable and some of which are unfavorable to the flow of the lubricant being used and the volume of lubricant distributed by the pump. Among such conditions are cold weather, which renders the lubricant less viscous, and close fit between the journal and its bearings which minimizes the lateral play of the journal.

If a pump be designed to function effectively under such unfavorable conditions (and this is essential), there is a likelihood of the pump supplying more oil than is necessary (with resulting loss of surplus oil) when operating under more favorable conditions such as warm weather, rapid and extended play of the journal in its bearings, which may be due to wear between the journal and its bearings, unusually rough track, etc.

The main object of the invention is to facilitate the recapture of a maximum amount of surplus lubricant fed to the journal, thereby reducing oil consumption.

Another object of the invention is to facilitate the flow of relatively cold and highly viscous lubricant by transferring thereto some of the heat generated by friction between the journal and its bearing.

This and other detailed objects of the invention are attained by the structure shown in the accompanying drawings, in which—

Figure 1:
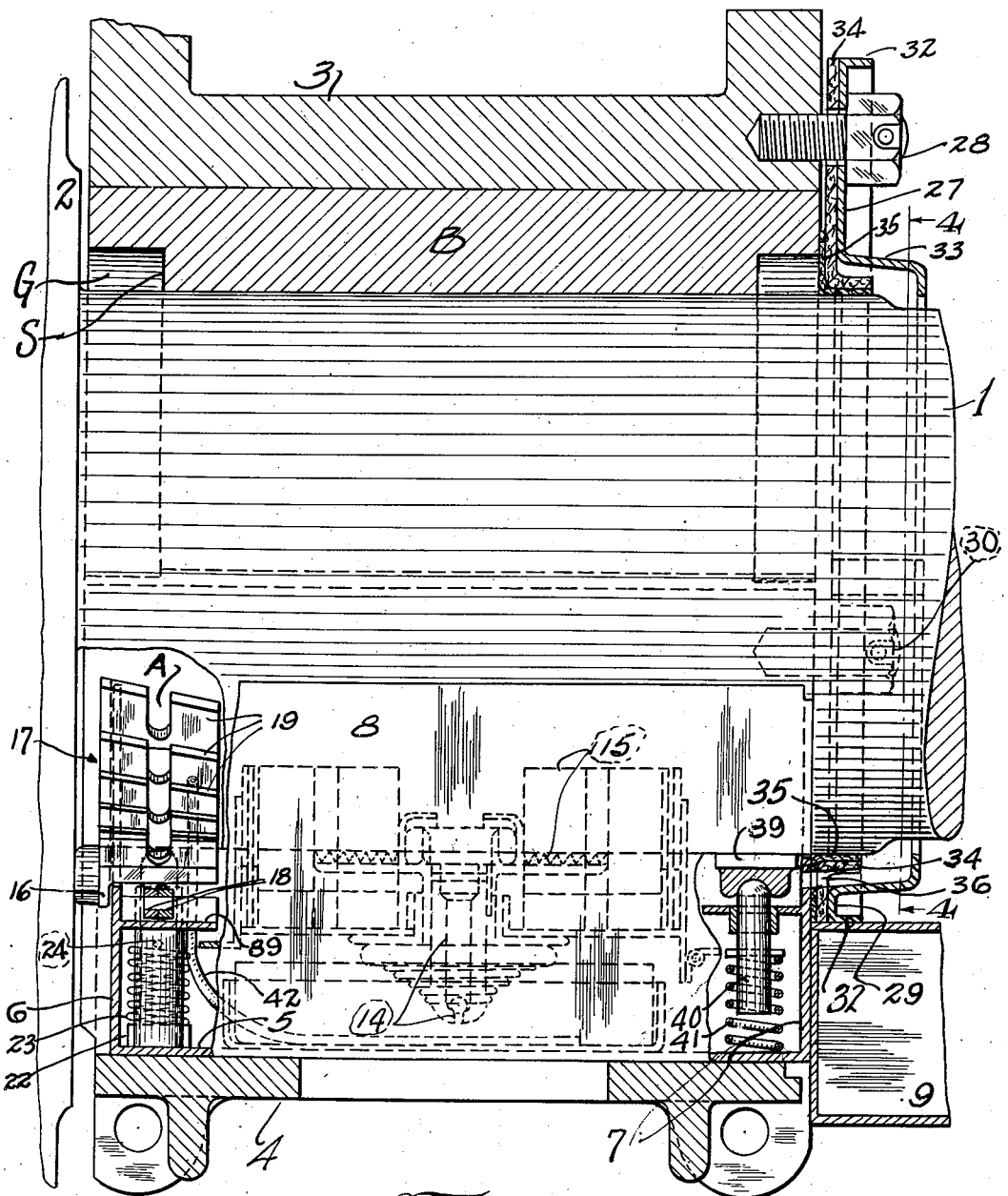
Figure 1 is a vertical section through, and a side elevation of, a locomotive driving box and journal equipped with a mechanical lubricator.
Figure 2:
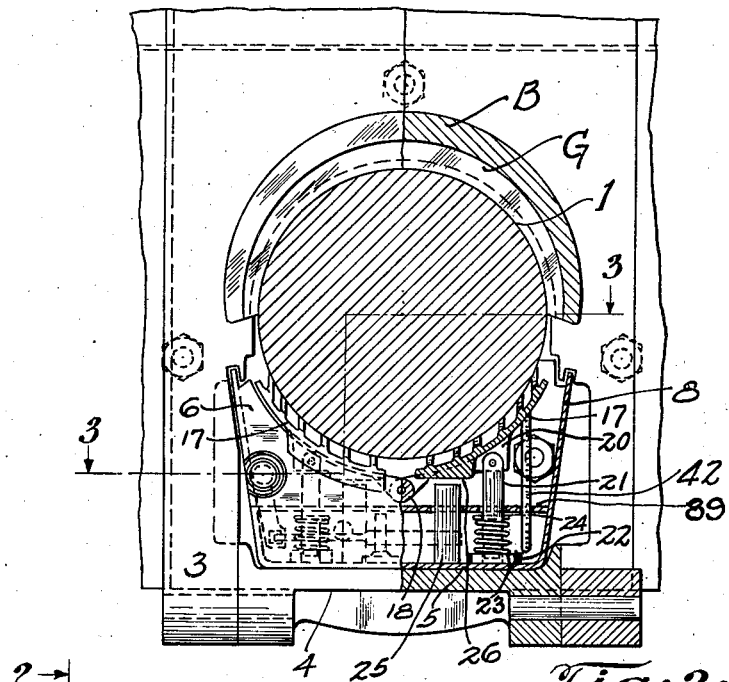
Figure 2 is a front view and vertical transverse section of the box and associated structure taken approximately on the line 2—2 of Figure 3.
Figure 3:
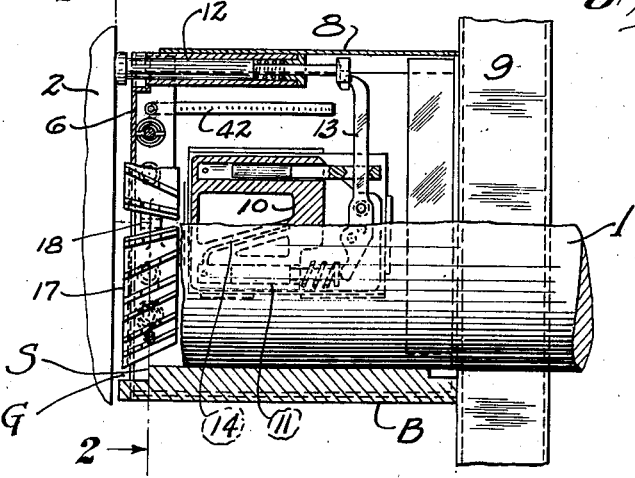
Figure 3 is a horizontal section taken approximately on the line 3—3 of Figure 2.
Figure 4:
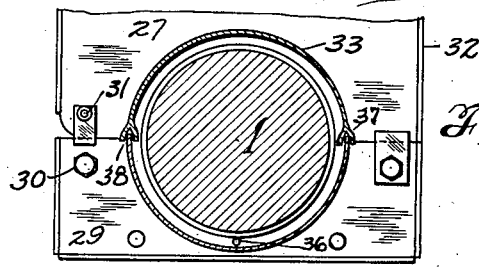
Figure 4 is a detail section taken approximately on the line 4—4 of Figure 1.

The axle is indicated at 1, and the inner hub portion of the driver is indicated at 2. The driving box is shown at 3 and the bottom spacers are indicated at 4. These parts are of familiar construction. A bearing B supports the box and the load on the axle and follows the usual arrangement except for the presence of a groove G at one end, the function of which will be referred to below.

A mechanical lubricator is applied to the box and includes a tank-like body or cellar having a bottom wall 5, a front wall 6, a rear wall 7 and side walls 8. The upper edges of these walls extend into downwardly facing recesses in the driving box to avoid the loss of oil. A sub-cellar or reservoir 9 projects from the cellar proper. The lubricator pump includes a body casting 10, a piston 11, a plunger 12, operated by the reciprocal movement of the axle and wheel hub relative to the box, and a lever 13 through which plunger 12 operates the pump piston. The oil is pumped from the cellar through the conduits 14 to the distributor 15. This structure is described and claimed in my copending application Serial No. 756,796, filed December 10, 1934, now Patent No. 2,123,946 issued July 19, 1938, (of which the present application is a continuation in part) and in itself does not constitute the present invention.

A journal wiper device at the outer end of the lubricator preferably comprises a pair of arcuate members 17 provided with overlapping lugs 18 by which members 17 are pivotally assembled. Lugs 18 and depending ribs 16 straddle end wall 6 to limit movement of the wipers longitudinally of the cellar. Each member 17 has a plurality of upstanding ribs 19 inclined inwardly and towards the longitudinal center line of the lubricator. The upper edges of ribs 19 are disposed to contact with the surface of axle journal 1. Each member 17 has a depending lug 20 pinned to a depending support 21, the lower end of which is slidably received in a boss 22 on the cellar bottom wall 5. A spring 23 engages a pin 24 to thrust support 21 and member 17 upwardly. The ribs of each member 17 have notches A disposed substantially in the vertical plane of the shoulder S at the inner end of a counter bore or groove G in the journal.

The oil supplied to the journal by the pump is carried upwardly by the rising side of the rotating journal and between the journal and the bearing to lubricate the same. Surplus oil between the journal and the bearing tends to travel longitudinally of the latter to the ends of the bearing, which usually are flush or beyond the ends of the box and the cellar and, accordingly, oil is distributed centrifugally and lost. In the above described structure, the oil reaching shoulder S tends to stick to the rotating bearing. Most of this oil will be wiped from the journal by the inner portions of ribs 19 but before the journal reaches the wiper ribs, sufficient oil will have moved along the journal to lubricate its end portion. Notches A in the ribs interrupt the outward movement of oil along the ribs and the outer portions of the ribs beyond the notches remove any surplus oil from the end portion of the journal thereby effecting maximum draining of oil to the interior of the cellar.

Upstanding buffers or stops 25 are mounted on the bottom wall of the lubricator and extend through the splash plate 89 with their upper ends opposing downwardly facing shoulders 26 on members 17. When the engine is lifted, as by a crane or derrick, its wheels and axles will be supported by the driving box spacer plates 4 through buffers 25 and members 17. This will avoid injury to the remainder of the lubricator structure.

Preferably tubes 42, or like elements of copper or other material which is highly conductive of heat, extend from wipers 17 downwardly through splash plate 89 and inwardly of the cellar. Heat generated by friction between the journal and the parts in contact therewith will be transmitted in part by tubes 42 to the oil in the bottom of the cellar, tending to quickly decrease its viscosity. This makes the oil flow more readily to the journal and the latter is more quickly covered with a protective film of lubricant. If for any reason a "hot box" condition develops, the increased heat transmitted to the oil in the cellar will result in a greater quantity of lubricant being pumped to the journal because of the decreased viscosity of the oil improving its "flowing" quality.

Escape of oil at the opposite end of the bearing is checked by a simple wiper structure comprising a blade 39 thrust against the journal by a plunger 40 supported by spring 41 seated on the bottom of the cellar. Also the opening in this end of the box is sealed by the structure illustrated in which the end plate 27 is attached to the top wall of the driving box by stud 28 and end plate 29 is attached to a side wall of the box by stud 30, or by being welded to the box, and serves to retain the lubricator in position. The two plates are hinged to each other at 31. The plates have flanges 32 at their outer edges and the inner portions of the plates are flanged or dished out as at 33 and are provided with a central aperture for surrounding the axle. Packing material 34, preferably of felt, is placed between end plate 27—29 and the rear faces of the driving box and lubricant rear wall. Around the journal is a flexible leather lining 35 and elements 35 and 34 are flanged, as shown, to overlie a portion of the axle. Notwithstanding this packing, some oil will tend to work along the axle beneath the packing and this oil, after clearing the packing, will form in droplets which will accumulate on the lower portion of the end plate and will flow through drain opening 36 back into a cellar. To prevent oil being discharged outwardly at the junction between plates 27 and 29, the latter are made in overlapping relation as indicated at 37 and 38 respectively, the upper plate being bifurcated to receive the lower plate.

The features described are effective in retaining the oil between the ends of the bearing or in returning surplus oil to the reservoir where it may be pumped again to the journal surface, and with this effective retaining and recapturing structure the pump may be designed to provide an adequate amount of oil under most unfavorable operating conditions because of the supply of more oil than is required when the device is operating under favorable conditions.

The details of the device may be varied substantially without departing from the spirit of the invention and some modifications in the details of the wiper and end plate structures are illustrated and described in my copending application Serial No. 711,933, filed February 19, 1934. Other modifications of the invention may be made without departing from the spirit thereof and the exclusive use of such modifications as come within the scope of the claims is contemplated.

I claim:

1. In combination, a journal box having a cellar, means for lubricating the journal, and a journal wiper comprising pivoted arms and means for yieldingly maintaining said arms in engagement with the journal, said arms including diagonal ribs and inclined elements adjacent said ribs for wiping oil from the journal and directing the same into said cellar.

2. In a railway locomotive journal lubricator, a lubricant cellar having relatively thin end walls, means for pumping lubricant from said cellar to the surface of the journal to which the lubricator is applied, and a device for wiping surplus lubricant from the journal, said device including a member extending over the end wall of the lubricant reservoir, means for yieldingly thrusting said member into contact with the journal and there being stops between said member and the bottom of the lubricator for limiting the compression of said yielding means, said member and stops being of size and vertical extent to support the journal and wheels thereon, when the vehicle is lifted, independently of said cellar end walls.

3. In combination, a railway journal lubricator device including a cellar having upstanding yielding supports, quadrant shaped wipers pivotally mounted on said supports with their concave portions facing upwardly to engage an axle journal and their lower ends pivoted to each other to maintain their alignment.

4. In combination, a railway journal lubricator device including a lubricant cellar with a front wall extending transversely of the journal, a pair of arcuate members arranged end to end over said wall with their adjacent ends pivoted to each other and with their concave faces provided with ribs extending transversely of said wall and disposed to engage the journal surface to wipe surplus oil therefrom and return it to said cellar, and means for holding said wipers with their concave faces against the journal.

5. Structure as described in claim 3 in which the holding means yieldingly supports said members from said cellar, there being rigid buffers for limiting the movement of said members towards said cellar.

6. In combination, a railway locomotive driving journal lubricator device including a cellar with a bottom wall disposed to rest upon a driving box spacer plate, yielding upstanding supports mounted on said wall, rigid upstanding buffers similarly mounted, journal wiper members carried by said supports and having shoulders opposing said buffers to transmit the weight of the journal and its load to the spacer plate when the locomotive is lifted.

7. In combination, a railway locomotive driver journal, a bearing thereon, a lubricator for said journal and bearing including a cellar having an end wall, and a member extending across said end wall for wiping surplus oil supplied to said journal, said bearing having a recess extending from its end inwardly over the journal and said wall, said recess including an outwardly facing shoulder, said wiper being grooved substantially along the vertical plane of said shoulder.

8. In combination, a railway locomotive driver journal, a bearing thereon, a lubricator for said journal and bearing including a cellar having an end wall, and a member extending across said end wall for wiping surplus oil supplied to said journal, said wiper comprising a plurality of upstanding ribs with their upper edges in contact with said journal, said bearing being recessed from its end inwardly over the journal and said wall and forming an outwardly facing shoulder at its inner end, there being a series of apertures traversing the upper edges of said ribs in the vertical plane of said shoulder.

9. In combination, a railway journal, a bearing thereon, a lubricant cellar, a device for pumping oil from said cellar to the journal, a member in frictional contact with the journal, and an element of relatively high heat conductivity extending from said member into said cellar to transmit heat of friction to lubricant in said cellar.

10. In combination, a railway journal, a bearing thereon, a lubricant cellar, a device for pumping oil from said cellar to the journal, wipers movably mounted on said cellar, there being means yieldingly thrusting said wipers against said journal, and heat conducting elements of copper or like material connected to said wipers and extending therefrom and throughout a substantial portion of said cellar to transmit frictional heat from said wipers to lubricant in said cellar.

11. In combination, a journal box having a cellar, means for lubricating a journal to which the box is applied, a journal wiper comprising arcuate arms extending transversely of the journal axis and pivoted to each other about an axis parallel to the journal axis, and means for yieldingly maintaining said arms in engagement with the journal near the end thereof to gather excess lubricant flowing longitudinally of the journal without interfering with lubricant on the intermediate portion of the journal.

12. The combination described in claim 11 in which the arcuate arms include elements extending inwardly and outwardly of the adjacent end wall of the cellar to collect and return oil flowing along the journal longitudinally of the cellar and beyond the limits thereof.

JAS. J. HENNESSY.